United States Patent Office 3,017,352
Patented Jan. 16, 1962

3,017,352
PROCESS OF INHIBITING CORROSION
William B. Hughes, and Verner L. Stromberg, Webster Groves, Mo., assignors to Petrolite Corporation, Wilmington, Del., a corporation of Delaware
No Drawing. Original application Mar. 3, 1958, Ser. No. 718,489, now Patent No. 2,987,521, dated June 6, 1961. Divided and this application Jan. 25, 1960, Ser. No. 4,175
5 Claims. (Cl. 252—8.55)

This application is a division of application S.N. 718,489, filed March 3, 1958, now U.S. Patent No. 2,987,521.

This invention relates to esters of hydroxyaliphatic cyclic amidine compounds and polycarboxylic acids, said esters containing at least one unesterified carboxylic acid group (i.e., where at least one but not all of the carboxylic acid groups are esterified, hereafter referred to as "partial esters"). More particularly, this invention relates to a process of preparing these partial esters which comprises reacting a hydroxyaliphatic cyclic amidine, for example, a hydroxyaliphatic imidazoline, or tetrahydropyrimidine with less than a stoichiometric amount of a polycarboxylic acid so that at least one of the carboxylic acid groups remains unesterified. This invention also relates to a process of using these partial esters as corrosive inhibitors in preventing the corrosion of metals, most particularly iron, steel and ferrous alloys.

Heretofore, a wide variety of cyclic amidine compounds have been employed to inhibit the corrosion of oil well equipment. Although we had expected that hydroxy-aliphatic cyclic amidines would also be effective in inhibiting oil field corrosion, we found that these compounds had very poor corrosion inhibiting properties.

However, we have now unexpectedly discovered that certain derivatives of these hydroxyaliphatic cyclic amidines, particularly the partial esters thereof, are very effective corrosion inhibitors, in many cases from 10 to 15 or more times as effective as the corresponding hydroxyaliphatic cyclic amidine. The corrosion inhibitors disclosed herein are particularly useful in preventing the corrosion of oil well equipment, for example, in producing wells, pipe lines, refineries, tank storage, etc., which are in contact with corrosive oil-containing medium, for example, in oil wells producing corrosive oil or oil-brine mixtures in refineries, and the like. These compositions possess properties which impart to metals resistance to attack by a wide variety of corrosive agents, among which may be mentioned brines, organic and inorganic acids, $CO_2$, $H_2O$, $O_2$, etc., and combinations thereof.

More specifically, the above described compounds may be described by the formulae:

(1)
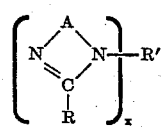

(2)
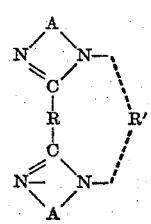

(The dotted lines indicate reactivity with the exact nature of the product being undetermined, probably polymeric.)

(3)
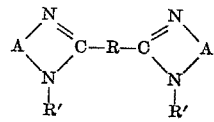

in which

and

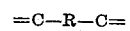

are the residual radicals derived from the carboxylic acids:

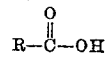

or

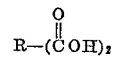

where R comprises, for example, a saturated or unsaturated aliphatic radical, a cycloaliphatic radical, an aryl radical, an aralkyl radical, an alkaryl radical, an alkoxyalkyl radical, an aryloxyalkyl radical, and the like; and A is an alkylene group, for example, ethylene and propylene radicals have a main chain of 2 or 3 carbon atoms, such as

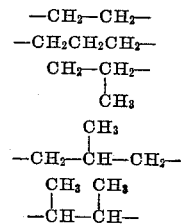

and $x$ is a whole number, 1 or greater, for example, 1–2, and R′ is the partial ester group derived from the reaction of a hydroxy containing alkylene, polyoxyalkylene, etc. groups with less than a stoichiometric amount of the polycarboxylic acid (i.e., the R′ contains at least one

group).

More specifically, the corrosion inhibiting aspect of this invention relates to a method of inhibiting corrosion of ferrous metals by hydrocarbon fluids containing water and corrosive materials such as $H_2S$, $CO_2$, inorganic acids, organic acids, etc., combinations of these materials with each other, combinations of each of said corrosive materials with oxygen, and combinations of said materials with each other and oxygen, which comprises treating such ferrous metals such as by adding to said fluids at least 5 parts per million of the above partial esters, said compounds being sufficiently soluble in the hydrocarbon fluid to inhibit corrosion.

THE HYDROXY ALIPHATICCYCLIC AMIDINE

The expression "cyclic amidines" is employed in its usual sense to indicate ring compounds in which there are present either 5 or 6 members, and having 2 nitrogen atoms separated by a single carbon atom supplemented by either two additional carbon atoms or three additional carbon atoms completing the ring. All the carbon atoms may be substituted. In the present instance the nitrogen atom of the ring involving two monovalent linkages (the 1-position) is substituted with a hydroxy aliphatic group, i.e., —(RO)$_n$H group when R is alkylene and $n$ is a whole number, for example, 1–5 or higher.

These cyclic amidines are further characterized as being substituted imidazolines and tetrahydropyrimidines in which the two-position carbon of the ring is generally bonded to a hydrocarbon radical or comparable radical derived from an acid, such as a low molal fatty acid, a high molal fatty acid, or comparable acids, polycarboxyacids, and the like.

For details of the preparation of imidazolines substituted in the 2-position from amines, see the following U.S. patents, U.S. No. 1,999,989, dated April 30, 1935, Max Bockmuhl et al.; U.S. No. 2,155,877, dated April 25, 1939, Edmund Waldmann et al.; and U.S. No. 2,155,878, dated April 25, 1939, Edmund Waldmann et al. Also see Chem. Rev. 32, 47 (43), and Chem. Rev. 54, 593 (54).

Equally suitable for use in preparing compounds useful in our invention and for the preparation of tetrahydropyrimidines substituted in the 2-position are the corresponding polyamines containing at least one primary amino group and one secondary amino group, or another primary amino group separated from the first primary amino group by three carbon atoms instead of being separated by only 2 carbons as with imidazolines. This reaction as in the case of the imidazolines is generally carried out by heating the reactants to a temperature at which 2 moles of water are evolved and ring closure is effected. For details of the preparation of tetrahydropyrimidines, see German Patent No. 700,371, dated December 18, 1940, to Edmund Waldmann and August Chwala; German Patent No. 701,322, dated January 14, 1941, to Karl Kiescher, Ernst Urech and Willi Klarer, and U.S. Patent No. 2,194,419, dated March 19, 1940, to August Chwala.

Substituted imidazolines and tetrahydropyrimidines are obtained from a variety of acids beginning with the one-carbon acid (formic) through and including higher fatty acids or the equivalent having as many as 30 carbon atoms for example from 8–22 carbons. Modified fatty acids also can be employed as, for example, phenyl stearic acid or the like. Cyclic acids may be employed, including naphthenic acids. A variety of other acids including benzoic acid, substituted benzoic acid, alicyclic acid, and the like, have been employed to furnish the residue

from the acid RCOOH in which the C of the residue

is part of the ring. The fatty acids employed, for example, may be saturated or unsaturated. They may be hydroxylated or nonhydroxylated. Branched long chain fatty acids may be employed. See J. Am. Chem. Soc. 74, 2523 (152). This applies also to the lower molecular weight acids as well.

Among sources of such acids may be mentioned straight chain and branched chain, saturated and unsaturated, aliphatic, cycloaliphatic, aromatic, hydroaromatic, aralkyl acids, etc.

Examples of saturated aliphatic monocarboxylic acids comprise: acetic, propionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids comprise: acrylic, methacrylic, crotonic, anglic, teglic, the pentenoic acids, the hexanoic acids, for example, hydrosorbic acid, the heptenoic acids, the octenoic acids, the nonenoic acids, the decenoic acids, for example, obtusilic acid, the undecenoic acids, the dodecenoic acids, for example lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elidic acid, the nonadecenoic acids, for example, the eicosenoic acid, the docosenoic acids, for example, erucic acid, brassidic acid, cetoleic acid, the tetracosenic acids, and the like.

Examples of dienoic acids comprise the pentadienoic acids, the hexadienoic acids, for example, sorbic acid, the octadienoic acids, for example, linoleic, and the like.

Examples of the trienoic acids comprise the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha hydroxy acids, comprise glycolic acid, lactic acid, the hydroxy-valeric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyactadecenoic acids, for example, ricinoleic acid, ricinelaidic acid, hydroxyoctadecynoic acids, for examle, ricinstearolic acid, the hydroxyeicosanoic acids, for example, hydroxyarachidic acid, the hydroxydocosanoic acids, for example, hydroxybehenic acid, and the like.

Examples of acetylated hydroxyacids comprise ricinoleyl lactic acid, acetyl ricinoleic acid, chloroacetyl ricinoleic acid, and the like.

Examples of the cyclic aliphatic carboxylic acids comprise those found in petroleum called naphthenic acids, hydnocarbic and chaulmoogric acids, cyclopentane carboxylic acids, cyclohexanecarboxylic acid, campholic acid, fencholic acids, and the like.

Examples of aromatic monocarboxylic acids comprise benzoic acid, substituted benzoic acids, for example, the toluic acids, the xyleneoic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other oil, castor oil, seal oil, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; aralkyl and aromatic acids, such as Twitchell fatty acids, naphthoic acid, carboxydiphenyl pyridine carboxylic acid, blown oils, blown fatty acids and the like.

Other suitable acids include phenylstearic acid, benzoylnonylic acid, cetyloxybutyric acid, cetyloxy-acetic acid, chlorstearic acid, etc.

Examples of the polycarboxylic acids comprise those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids comprise fumaric, maleic, mesoconic, citraconic, glutonic, itaconic, muconic, aconitic acids, and the like.

Examples of aromatic polycarboxylic acids comprise phthalic, isophthalic, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups comprise hemimellitic, trimellitic, trimesic, mellophanic, prehnitic, pyromellitic acids, mellitic acid, and the like.

Other polycarboxylic acids comprise the dimeric, trimeric and poly acids, for example, the Emery Industries polymeric acids such as those described in U.S. Patent 2,263,612, and the like. Other polycarboxylic acids comprise those containing ether groups, for example, diglycollic acid. Mixtures of the above acids can be advantageously employed.

In addition, acid precursors such as esters, acid chlorides, glycerides, etc. can be employed in place of the free acid.

Where the acid contains functional groups such as hydroxy groups, this should be taken into consideration in subsequent acylation in calculating the stoichiometry of acylating the hydroxyaliphatic cyclic amidine.

Hydroxy substituted imidazolines and tetrahydropyrimidines are obtained in the manner described above from a wide variety of polyamines containing hydroxy groups. Thus, where one starts with a polyamine, for example, a diamine of the following formula

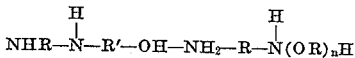

where R has 2 or 3 carbon main chains one obtains the hydroxyalkylene compounds useful in this invention. In addition, one can start with ethylene diamine or with 1,2-propylene diamine, 1,3-propylenediamine or other polyamines and then react the cyclic amidine so obtained with alkylene oxides so as to produce a terminal hydroxyl group since the nitrogen bonded hydrogen on the 1-position on the group reacts with alkylene oxides. In addition the hydroxyalkylene groups can be oxyalkylated.

Alkylene oxides comprise those of the general formula

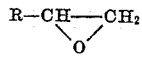

where R is H or an alkyl group. Among the alkylene oxides that may be employed are ethylene, propylene, butylene, octylene, etc., oxides, etc. Other oxyalkylation agents such as glycide, epichlorohydrin, etc., can be employed.

Thus, compounds, within the scope of this invention which react with polycarboxylic acids comprise compounds of the formulae:

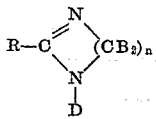

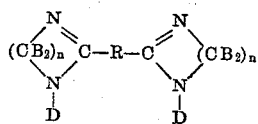

where

is the residue derived from the carboxylic acid, where R is a hydrocarbon radical having, for example, up to about 30 carbon atoms such as 1–30 carbon atoms, and hydrocarbons in which the carbon atom chain is interrupted by oxygen, etc., $n$ is 2 or 3, and B is a hydrogen or a hydrocarbon radical, for example, a lower alkyl radical; and D is a hydroxy-aliphatic radical, for example, —ROH or —R—(OR)$_x$OH, wherein $x$ is a whole number, for example, 1–10 or more but preferably 1–5 and CH$_2$ is, for example, a divalent radical of the formula:

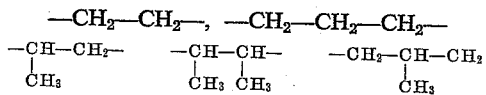

etc.

In general, the hydroxyalkyl cyclic amines are prepared by reacting a polyamine containing a terminal alkanol group with a carboxylic acid at temperatures of from 150–175° C. employing an azeotroping agent such as xylene to remove water. The reaction time of 3–4 hours is employed. Completion of reaction is judged by the separation of 2 moles of H$_2$O for each carboxylic acid group. The products in general are dark viscous oil. Since the preparation of cyclic amidines is so well known (see above cited patents) it is not believed that any examples are necessary to illustrate such a well known procedure. However, for purposes of illustration the following examples are included.

*Example 10a*

A solution of 1 mole of hydroxyethyl ethylene diamine

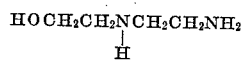

and 1 mole of oleic acid in 300 grams of xylene are charged to a flask and brought to reflux, the mixture being heated under a Dean-Stark water trap condenser in order to distill off the water-xylene azeotrope mixture, separate the water and to continuously return xylene to the reaction mixture. Reflux is continued at a temperature of 160–170° C. for about 3½ hours until about 2 moles of water are removed. The product is

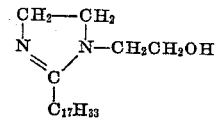

*Example 9b*

The above example is repeated except that hydroxyethyl propylene diamine 1-3

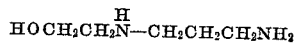

is employed in place of hydroxyethylethylene diamine and stearic acid is employed in place of oleic acid. The product is

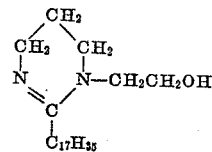

Example 4c

Example 10a is repeated except that

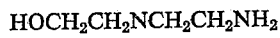

HOCH₂CH₂NCH₂CH₂NH₂

(2 moles) and a polycarboxylic acid, sebacic acid (1 mole), are employed. Instead of two moles of water being removed, as in the prior example, 4 moles of water are removed. The product is

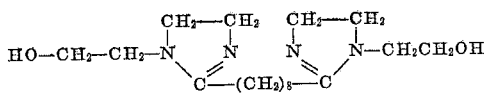

Example 20d

Example 4c is repeated with

HOCH₂CH₂NCH₂CH₂CH₂NH₂ (2 moles)

and the polycarboxylic acid is terephthalic acid (1 mole). As in the prior example, 4 moles of water are removed. The product is

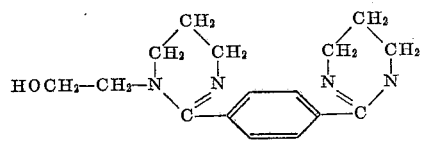

In general, to form the polyoxyalkylated hydroxy cyclic amidines, the hydroxyalkylcyclic amidine is first prepared in the manner shown above and then reacted with alkylene oxides by the conventional manner of oxyalkylation to the desired degree of oxyalkylation using a jacketed stainless steel autoclave in the manner described in U.S. Patent 2,792,369. The following examples are illustrative:

Example 11a

One mole of

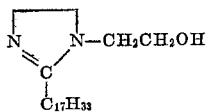

(50% solution in xylene) is reacted with 1 mole of ethylene oxide at a temperature of 125–130° C. and a pressure of 10–15 p.s.i. The time regulator is set to add ethylene oxide over ½ hour followed by additional stirring for another ½ hour to insure complete reaction. Ethylene oxide is readily taken up by the reactants. The product is

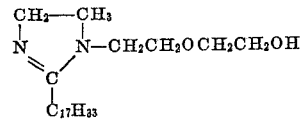

Example 12a

The above example is repeated using a propylene oxide and

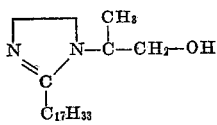

under similar conditions.
The product is

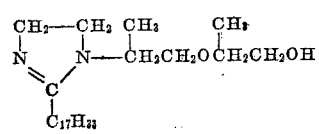

Example 28a

Example 11a is repeated except that 2 moles of ethylene oxide are employed. The product is

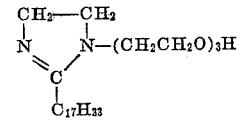

The above examples are typical methods of preparation. The following hydroxycyclic amidines are prepared by these methods.

TABLE I

| Ex. No. | RCOOH source of RC | R' |
|---|---|---|
| 1a | Lauric | CH₂CH₂OH |
| 2a | Hexanoic | CH₂HC₂OH |
| 3a | Isovaleric | CH₂CH₂OH |
| 4a | Stearic | CH₂CH₂OH |
| 5a | Melissic | CH₂CH₂OH |
| 6a | Phenyl stearic | CH₂CH₂OH |
| 7a | Benzoic | CH₂CH₂OH |
| 8a | Cresotinic | CH₂CH₂OH |
| 9a | Naphthenic | CH₂CH₂OH |
| 10a | Oleic | CH₂CH₂OH |
| 11a | do | CH₂CH₂OCH₂CH₂OH |
| 12a | do | CH₂CH₂OĊHCH₂OH (CH₃ groups) |
| 13a | Lauric | CH₂CH₂OC₂H₂CH₂OH |
| 14a | Palmitic | CH₂CH₂OC₂H₂CH₂OH |
| 15a | Cerotic | CH₂CH₂OC₂H₂CH₂OH |
| 16a | p-tert-Butyl benzoic | CH₂CH₂OC₂H₂CH₂OH |
| 17a | Benzoic | CH₂CH₂OC₂H₂CH₂OH |
| 18a | Toluic | CH₂CH₂OC₂H₂CH₂OH |
| 19a | Naphthenic | CH₂CH₂OC₂H₂CH₂OH |
| 20a | Benzoic | CH₂CH₂OC₂H₂CH₂OH |
| 21a | Formic | CH₂CH₂OC₂H₂CH₂OCH₂CH₂OH |
| 22a | Methyloctadecanoic | CH₂CH₂OC₂H₂CH₂OCH₂CH₂OH |
| 23a | Capric | CH₂CH₂OC₂H₂CH₂OCH₂CH₂OH |
| 24a | Stearic | CH₂CH₂OC₂H₂CH₂OCH₂CH₂OH |
| 25a | Phenylstearic | CH₂CH₂OC₂H₂CH₂OCH₂CH₂OH |
| 26a | Cresotinic | CH₂CH₂OC₂H₂CH₂OCH₂CH₂OH |
| 27a | Linoleic | CH₂CH₂OC₂H₂CH₂OCH₂CH₂OH |
| 28a | Oleic | CH₂CH₂OC₂H₂CH₂OCH₂CH₂OH |
| 29a | 3-methoxybenzoic | CH₂CH₂OC₂H₂CH₂OCH₂CH₂OH |
| 30a | Naphthenic | CH₂CH₂OC₂H₂CH₂OCH₂CH₂OH |

TABLE II

| Ex. No. | RCOOH source of RC | R' |
|---|---|---|
| 1b | Formic | CH₂CH₂OH |
| 2b | Acetic | CH₂CH₂OH |
| 3b | Butyric | CH₂CH₂OH |
| 4b | Valeric | CH₂CH₂OH |
| 5b | Isovaleric | (CH₃)₂CH₂CH₂OH |
| 6b | Trimethyl acetic | CH₂CH₂OH |
| 7b | Pelargonic | CH₂CH₂OH |
| 8b | Lauric | CH₂CH₂OCH₂CH₂OH |
| 9b | Stearic | CH₂CH₂OH |
| 10b | Arachidic | CH₂CH₂OH |
| 11b | Eucosane-carboxylic | (CH₃)₂CH₂CH₂OH |
| 12b | Cerotic | CH₂CH₂OH |
| 13b | Melissic | CH₂CH₂OH |
| 14b | Phenyl stearic | CH₂CH₂OH |
| 15b | Benzoic | CH₂CH₂OCH₂CH₂OH |
| 16b | b-Methybenzoic acid | CH₂CH₂OH |
| 17b | Cresotinic | CH₂CH₂OH |
| 18b | p-Methybenzoic | CH₂CH₂OH |
| 19b | p-tert-Butylbenzoic | CH₂CH₂OH |
| 20b | 3-Methoxy benzoic | CH₂CH₂OH |
| 21b | Oleic | CH₂CH₂OH |
| 22b | Undecylenic | CH₂CH₂OH |
| 23b | Linoleic | CH₂CH₂OH |
| 24b | Butyric | CH₂CH₂OH |
| 25b | Methyloctadecanoic | CH₂CH₂OH |

TABLE III

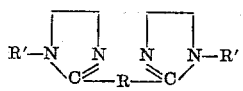

| Ex. No. | HOOC—R—COOH source of —CRC— | R' |
|---|---|---|
| 1c | Malonic | CH₂CH₂OH |
| 2c | Adipic | CH₂CH₂OH |
| 3c | Suberic | CH₂CH₂OH |
| 4c | Sebacic | CH₂CH₂OH |
| 5c | Nonodecane dicarboxylic | CH₂CH₂OH |
| 6c | Diglycolic | CH₂CH₂OH |
| 7c | Ethylene bis(glycolic) | CH₂CH₂OH |
| 8c | Methylene dibenzoic | CH₂CH₂OH |
| 9c | Stearyl malonic | CH₂CH₂OH |
| 10c | Phthalic | CH₂CH₂OH |
| 11c | Succinic | CH₂CH₂OCH₂CH₂OH |
| 12c | Glutaric | CH₂CH₂OCH₂CH₂OH |
| 13c | Pimelic | CH₂CH₂OCH₂CH₂OH |
| 14c | Azelaic | CH₂CH₂OCH₂CH₂OH |
| 15c | Eicosane dicarboxylic | CH₂CH₂OCH₂CH₂OH |
| 16c | Dilinoleic | CH₂CH₂OCH₂CH₂OH |
| 17c | Isophthalic | CH₂CH₂OCH₂CH₂OH |
| 18c | Diglycolic | CH₂CH₂OCH₂CH₂OH |
| 19c | Lauryl malonic | CH₂CH₂OCH₂CH₂OH |
| 20c | Methylene dibenzoic | CH₂CH₂OCH₂CH₂OH |
| 21c | Malonic | CH₂CH₂OC₂H₂CH₂OCH₂CH₂OH |
| 22c | Succinic | CH₂CH₂OC₂H₂CH₂OCH₂CH₂OH |
| 23c | Suberic | CH₂CH₂OC₂H₂CH₂OCH₂CH₂OH |
| 24c | Pimelic | CH₂CH₂OC₂H₂CH₂OCH₂CH₂OH |
| 25c | Nonedecane dicarboxylic | CH₂CH₂OC₂H₂CH₂OCH₂CH₂OH |
| 26c | Diglycolic | CH₂CH₂OC₂H₂CH₂OCH₂CH₂OH |
| 27c | Methylene dibenzoic | CH₂CH₂OC₂H₂CH₂OCH₂CH₂OH |
| 28c | Stearyl malonic | CH₂CH₂OC₂H₂CH₂OCH₂CH₂OH |
| 29c | Stearyl succinic | CH₂CH₂OC₂H₂CH₂OCH₂CH₂OH |
| 30c | Terephthalic | CH₂CH₂OC₂H₂CH₂OCH₂CH₂OH |

TABLE IV

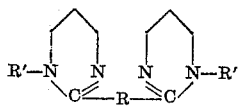

| Ex. No. | HOOC—R—COOH source of —CRC— | R' |
|---|---|---|
| 1d | Malonic | CH₂CH₂OH |
| 2d | Succinic | CH₂CH₂OH |
| 3d | Glutaric | CH₂CH₂OH |
| 4d | Adipic | CH₂CH₂OH |
| 5d | Suberic | (CH₃)CH₂CH₂OH |
| 6d | Sebacic | CH₂CH₂OH |
| 7d | Pimelic | CH₂CH₂OCH₂CH₂OH |
| 8d | Azelaic | CH₂CH₂OH |
| 9d | Nonodecane dicarboxylic | CH₂CH₂OH |
| 10d | Eicosane dicarboxylic | CH₂CH₂OH |
| 11d | Diglycolic | CH₂CH₂OH |
| 12d | Ethylene bisglycolic | (CH₃)CH₂CH₂OH |
| 13d | Methylene dicarboxylic acid | (CH₃)CH₂CH₂OH |
| 14d | Dilinoleic | CH₂CH₂OH |
| 15d | Stearyl malonic | CH₂CH₂OH |
| 16d | Lauryl succinic | CH₂CH₂OH |
| 17d | Isotetradecyl succinic | CH₂CH₂OH |
| 18d | Phthalic | CH₂CH₂OCH₂CH₂OH |
| 19d | Isophthalic | CH₂CH₂OH |
| 20d | Terephthalic | CH₂CH₂OH |
| 21d | Glutaconic | CH₂CH₂OH |
| 22d | Sebacic | CH₂CH₂OH |

THE POLYCARBOXYLIC ACIDS

The polycarboxylic acid employed to react with the hydroxycyclicamidine can be varied widely. In general, they can be expressed as

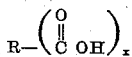

where R comprises a saturated or unsaturated aliphatic radical, a cycloaliphatic radical, an aromatic radical, and the like, and x is a whole number equal to 2 or more, for example, 2–4, but preferably 2.

Examples of the polycarboxylic acids comprise those of the aliphatic series, for example, oxalic, malonic, succinic, glutaric, adipic, pimelic, suberic, azelaic, sebacic, nonanedicarboxylic acids, decanedicarboxylic acids, undecanedicarboxylic acids, and the like.

Examples of unsaturated aliphatic polycarboxylic acids comprise fumaric, maleic, mesocenic, citraconic, glutonic, itaconic, muconic, aconitic, and the like.

Examples of aromatic polycarboxylic acids comprise phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups comprise hemimellitic, trimellitic, trimesic, mellophanic, prehinitic, pyromellitic acids, mellitic, acid, and the like.

Other polycarboxylic acids comprise the dimeric, trimeric and other polyacids, for example, the Emery Industries polyacids such as those disclosed in U.S. Patent 2,763,612, and the like. Other polycarboxylic acids comprise those containing ether groups, for example, diglycollic acid. Mixtures of the above acids can be advantageously employed.

In addition, acid precursors such as esters, acid chlorides, glycerides, etc. can be employed in place of the free acid.

THE PARTIAL ESTER PRODUCTS

The products of this invention are partial esters of cyclic amidines. They may be expressed by the following general formula:

wherein A comprises a molecule containing at least one cyclic amidine group having at least one ester side-chain and x is a whole number preferably 1. The

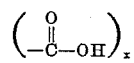

of the formula indicates that the product is a partial ester having at least one free carboxylic acid group.

Thus, the products of this invention may be illustrated with dicarboxylic acids as follows:

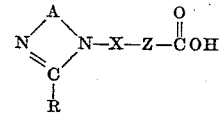

where X includes a

a

etc. group and X is the radical derived from the polycarboxylic acid.

In the case where bicyclic amidine compounds are used as hydroxy precursors, the structure might possibly be as follows:

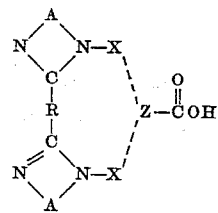

wherein x and Z have the meanings of the preceding formula groups. Since the hydroxy precursor is bifunctional (i.e., has two hydroxy groups) and the polycarboxylic acid is also polyfunctional, polyesters probably form since the structure is uncertain, it is indicated by dotted lines. These polyesters are useful as corrosion inhibitors provided they are partial esters (i.e. have at least one free carboxylic acid group), and are sufficiently soluble in the hydrocarbon to be effective.

The following examples are illustrative of the preparation of partial esters. Two moles of carboxylic acid radical are employed for each mole of hydroxy group.

*Example 10aA*

One mole of the product of Example 10a and 1 mole of sebacic acid are dissolved in 300 g. of xylene and the reaction mixture, heated to reflux, is azeotroped, using a Dean-Stark trap in the manner of Example 10a, until one mole of water is removed. The temperature is maintained at 150–175° C. and the time is 5 hours. The product is $$\begin{array}{c} CH_2\!-\!CH_2 \\ N \quad\quad N\!-\!CH_2CH_2O\overset{O}{\overset{\|}{C}}\!-\!(CH_2)_8\overset{O}{\overset{\|}{C}}\!-\!OH \\ \diagdown C \diagup \\ | \\ C_{17}H_{33} \end{array}$$

*Example 10aC*

The process of the prior example is repeated except that terephthalic acid is employed in place of sebacic acid. The product is $$\begin{array}{c} CH_2\!-\!CH_2 \\ N \quad\quad N\!-\!CH_2CH_2O\overset{O}{\overset{\|}{C}}\!-\!\!\bigcirc\!\!-\!\overset{O}{\overset{\|}{C}}OH \\ \diagdown C \diagup \\ | \\ C_{17}H_{33} \end{array}$$

*Example 10aD*

The above example is repeated employing 1.5 moles of $$\begin{array}{c} CH_2\!-\!CH_2 \\ N \quad\quad N\!-\!CH_2CH_2OH \\ \diagdown C \diagup \\ | \\ C_{17}H_{33} \end{array}$$

and 1 mole of trimeric acid (trilinoleic acid) to yield a dark viscous product of undetermined structure.

*Example 9bA*

The process of the above example is repeated except that 1 mole of $$\begin{array}{c} CH_2 \\ CH_2 \diagup \diagdown CH_2 \\ N \quad\quad N\!-\!CH_2CH_2OH \\ \diagdown C \diagup \\ | \\ C_{17}H_{35} \end{array}$$

is reacted with 1 mole of adipic acid.
The product is $$\begin{array}{c} CH_2 \\ CH_2 \diagup \diagdown CH_2 \\ N \quad\quad N\!-\!CH_2CH_2O\!-\!\overset{O}{\overset{\|}{C}}\!-\!(CH_2)_4\!-\!\overset{O}{\overset{\|}{C}}OH \\ \diagdown C \diagup \\ | \\ C_{17}H_{35} \end{array}$$

*Example 4cA*

The process of the above example is repeated except that one mole of $$HOCH_2CH_2\!-\!\begin{array}{c} CH_2\!-\!CH_2 \\ N \quad\quad N \\ \diagdown C \diagup \\ | \\ (CH_2)_6 \end{array}\!\!\!\begin{array}{c} CH_2\!-\!CH_2 \\ N \quad\quad N\!-\!CH_2CH_2OH \\ \diagdown C \diagup \end{array}$$

and 2 moles of dimeric acid (dilinoleic acid) are employed. The structure of this product is uncertain except that it is polymeric product containing free carboxylic acid groups.

*Example 28aA*

The above process is repeated except that 1 mole of $$\begin{array}{c} CH_2\!-\!CH_2 \\ N \quad\quad N\!-\!(CH_2CH_2O)_3H \\ \diagdown C \diagup \\ | \\ C_{17}H_{33} \end{array}$$

and one mole of diglycolic acid are employed.
The product is $$\begin{array}{c} CH_2\!-\!CH_2 \\ N \quad\quad N\!-\!(CH_2CH_2O)_3\!-\!\overset{O}{\overset{\|}{C}}\!-\!CH_2\!-\!O\!-\!CH_2\!-\!\overset{O}{\overset{\|}{C}}OH \\ \diagdown C \diagup \\ | \\ C_{17}H_{33} \end{array}$$

The above examples are typical methods of preparation. The following partial esters are prepared by these methods. Each partial ester will have the basic number shown in the prior tables, for example, 1a, 10a, etc., indicative of the hydroxy cyclic amidine employed. In addition, it will bear the letter A which indicates that it has been acylated to a partial ester. In each Example 2 moles of carboxylic acid radicals are employed for each mole of hydroxy group.

TABLE V
Partial Esters

| | | | |
|---|---|---|---|
| 2aA | Adipic | 9bB | Sebacic |
| 4aA | Sebacic | 9bC | Terephthalic |
| 4aB | Terephthalic | 9bD | Succinic |
| 10aA | Adipic | 21bA | Sebacic |
| 10aB | Sebacic | 21bB | Terephthalic |
| 10aC | Terephthalic | 4cA | Dimeric (dilinoleic acid) |
| 10aD | Trimeric (trilinoleic acid) | 4cB | Terephthalic |
| 10aE | Succinic | 6cA | Glutaric |
| 13aA | Sebacic | 6cB | Pimelic |
| 13aB | Adipic | 6cC | Adipic |
| 15aA | Suberic | 14cA | Adipic |
| 15aB | Dimeric acid (dilinoleic) | 14cB | Sebacic |
| 24aA | Adipic | 23cA | Sebacic |
| 24aB | Isophthalic | 23cB | Isophthalic |
| 28aA | Diglycolic | 23cC | Adipic |
| 8bA | Adipic | 8dA | Adipic |
| 9bA | Adipic | 8dB | Sebacic |

USE AS CORROSION INHIBITOR

More specifically, this phase of the invention relates to the inhibition of corrosion in the petroleum industry with specific reference to producing wells, pipe lines, refineries, tank storage, etc.

The use of a corrosion inhibiting agent in the oil industry and other industries, and particularly for the protection of ferrous metals, is well known. For example, see U.S. Patents Nos. 2,736,658, dated February 28, 1954, to Pfohl et al., and 2,756,211, dated July 24, 1956, to Jones, and 2,727,003, dated December 13, 1955, to Hughes.

More specifically then, and particularly from the standpoint of oil production, this aspect of the invention relates to inhibiting corrosion caused by hydrogen sulfide, carbon dioxide, inorganic and organic acids, combinations of each with oxygen, and with each other and oxygen. More particularly, it relates to treating wells to mitigate metal corrosion and associated difficulties.

It should also be pointed out that the corrosiveness of oil well brines will vary from well to well, and the proportion of corrosion inhibiting agent added to the well fluids should also be varied from well to well. Thus, in some wells it is possible to effectively control corrosion by the addition of as little as 5 p.p.m. of our new compositions to the well fluids, whereas in other wells, it is necessary to add 200 p.p.m. or more.

In using our improved compositions for protecting oil well tubing, casing and other equipment which comes in contact with the corrosive oil-brine production, we find that excellent results may be obtained by injecting an appropriate quantity of a selected composition into a producing well so that it mingles with the oil-brine mixture and come into contact with the casing, tubing, pumps and other producing equipment. We, for example, can introduce the inhibiting composition into the top of the casing, thus causing it to flow down into the well and thence back through the tubing, etc. In general, we have found that this procedure suffices to inhibit corrosion throughout the entire system of production, and collection, even including field tankage.

In case serious emulsion or gel problems are encountered, demulsifiers are advantageously added. This is important not only to avoid the troublesome emulsions and gels themselves, but also to improve corrosion inhibition. The explanation of less effective corrosion inhibition in the presence of emulsions apparently is that the inhibitor is somewhat surface-active. That is, it is concentrated at interfacial surfaces. Since this surface is great in an emulsion, most of the inhibitor will be concentrated in these interfaces and little will remain in the body of the oil for deposition on the metal surfaces. In many wells, oil-in-water type emulsions often occur naturally. In such wells the inhibitors herein described tending to form water-in-oil type emulsions, often decrease the emulsion problems naturally present. Thus, in addition to being effective corrosion inhibitors, the herein described products tend to eliminate emulsion problems which sometimes appear when some of the present day inhibitors are used in oil wells or refinery processing.

The method of carrying out our process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, in organic and organic acids, $O_2$ and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all well-head fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "boll weevil" device or similar arrangement. Where the inhibitor is a solid, it is dropped into the well as a solid lump or stick, blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the soution and injection equipment during winter use.

For treating wells with packed-off tubing, the use of solid "sticks" or plugs of inhibitor is especially convenient. These are prepared by blending the inhibitor with a mineral wax, asphalt or resin in a proportion sufficient to give a moderately hard and high-melting solid which can be handled and fed into the well conveniently.

The amount of corrosion preventive agent required in our process varies with the corrosiveness of the system, but where as continuous or semi-continuous treating procedure is carried out as described above, the addition of reagent in the proportion of from 5 parts per million to 1000 parts per million or more parts of corrosive fluid will generally provide protection.

These corrosion inhibitors can be used in combination with other well-known corrosion inhibitors, for example, the cyclic amidine structures, the amino cyclic amidine structures, and the amino cyclic amidine structures, as disclosed in the Blair and Gross Reissue Patent No. 23,227. When the herein described products are mixed with corrosion inhibitors of the conventional type in the ratio of one-to-three, one-to-one, three-to-one, or the like, in numerous instances the effectiveness of the corrosion inhibitor thus obtained is often significantly greater than the use of either one alone.

Since these products are basic they can be combined with various acids to produce salts in which oil solubility is increased or decrease. Likewise, water solubility is increased or decreased. For instance, the products are mixed with one or more moles of an acid, such as higher fatty acids, dimerized fatty acids, naphthenic acids, acids obtained by the oxidation of hydrocarbons, as well as sulfonic acids such as dodecylbenzene sulfonic acid, petroleum mahogany acids, petroleum green acids, etc.

What has been said in regard to the acids which increase oil solubility and decrease water solubility applies with equal force and effect to acids of the type, such as acetic acid, hydroxyacetic acid, gluconic acid, etc., all of which obviously introduce hydrophile character when they form salts or complexes, if complexes are formed. For example, any of the acids described above in preparing the cyclic amidines are useful in preparing these salts.

As pointed out previously, the addition of cororsion inhibitors, particularly in the form of a solution by means of a metering pump or the like, is common practice. The particular corrosion inhibitors herein described are applied in the same manner as other corrosion inhibitors intended for use for the same purpose. For sake of brevity, as to the use of the corrosion inhibitor and its solution in a suitable solvent such as mineral oil, methyl ethyl ketone, xylene, kerosene, high boiling aromatic solvent, or even water.

*Stirring tests.*—These tests are run on synthetic fluids. The procedure involves the comparison of the amount of iron in solution after a predetermined interval of time of contact of a standardized iron surface with a two-phase corrosive medium with similar determinations in systems containing inhibitors.

Six hundred ml. beakers equipped with stirrers and heaters are charged with 400 ml. of 10% sodium chloride containing 500 p.p.m. acetic acid and 100 ml. of mineral spirits. The liquids are brought to temperature and a 1 x 1 inch sand blasted coupon is suspended by means of a glass hook approximately midway into the liquid phase of the beaker. The stirrer is adjusted to agitate the liquids at such a rate as to provide good mixing of the two layers.

After 30 minutes samples of the aqueous phase are taken and the iron content of each sample is determined by measuring the color formed by the addition of hydrochloric acid and potassium thiocyanate in a photoelectric colorimeter.

The protection afforded by an inhibitor is measured by comparison of the amount of light absorbed by inhibited and uninhibited samples run simultaneously. Percent protection can be determined by the following formula:

$$\frac{A_1 - A_2}{A_1} \times 100 = \text{percent protection}$$

where $A_1$ is the present light absorbed by an uninhibited sample and $A_2$ is the same value for an inhibited sample.

Results of a typical run are set forth in the following table:

TABLE VI

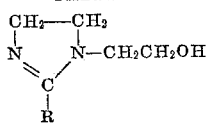

[Stirring test at room temperature. Inhibition concentration of 10 p.p.m. based on total fluids]

| Ex. | Inhibitor R | Acid | Weight loss, mg. | Percent protection |
|---|---|---|---|---|
|  |  |  | 102.2 |  |
| 10aA | $C_{17}H_{33}$ | Adipic | 1.0 | 99 |
| 10aB | $C_{17}H_{33}$ | Sebacic | 0.6 | 99 |
| 10aC | $C_{17}H_{33}$ | Terephthalic | 0.4 | 99 |
| 13aB | $C_{17}H_{33}$ | Adipic | 1.1 | 98 |
| 2aA | $C_5H_{11}$ | do | 4.3 | 95 |
|  | $C_{17}H_{33}$ | None [1] | 78.4 | 23 |
|  | Commercial inhibitor A [2] |  | 22.2 | 79 |
|  | Commercial inhibitor B [2] |  | 20.9 | 80 |

[1] The unesterified amine.
[2] Infra-red analysis indicates imidazoline structure.

TABLE VII

[Stirring test at 140° F.* 40 p.p.m.]

| Ex. | Inhibitor R | Acid | Percent protection |
|---|---|---|---|
| 10aB | $C_{17}H_{33}$ | Sebacic | 99 |
| 10aC | $C_{17}H_{33}$ | Terephthalic | 99 |
| 13aB | $C_{17}H_{35}$ | Adipic | 97 |
|  | $C_{17}H_{33}$ | None [1] | 19 |
|  | Commercial inhibitor A [2] |  | 81 |

[1] Unesterified amine.
[2] Infra-red indicates imidazoline structure.
* It has been noted that some compounds have a definite actuation energy so these tests are often run at room temperature as well as at elevated temperature.

*Tanker tests (cycle tests).*—This test was described by Malcolmson et al. (Annual Meeting of the Society of Naval Architects and Marine Engineers, New York, November. 1952). It involves the measurement by weight loss of coupons which have been subjected to the corrosive action of sea water and a hydrocarbon for a week followed by contact for one week with sea water and air, and the composition there to the weight loss of coupons subjected to a similar test in which a small amount of inhibitor has been added to the hydrocarbon phase.

TABLE VIII

[Tanker test (cycle test)]

| Ex. | Inhibitor R | Acid | Weight loss mg. | | | Percent protection | | |
|---|---|---|---|---|---|---|---|---|
|  |  |  | 10 p.p.m. | 20 p.p.m. | 30 p.p.m. | 10 p.p.m. | 20 p.p.m. | 30 p.p.m. |
| 10aC | $C_{17}H_{33}$ | Terephthalic | 11.0 | 9.5 | 11.7 | 72.5 | 76.0 | 76.0 |
| 13aB | $C_{17}H_{35}$ | Adipic | 11.8 | 12.8 | 18.2 | 56.2 | 68.0 | 54.5 |
|  | Commercial inhibitor C [1] |  | 21.2 | 19.6 | 20.0 | 50.0 | 52.5 | 53.0 |

[1] Infra-red indicates imidazoline structure.
NOTE.—$C_{17}H_{33}$, free alcohol, weight loss mg. (100 p.p.m.) 200.6, percent protection (100 p.p.m.) 4.5.

The unexpectedness of the invention is quite evident from the above data. The products of the present invention are superior to both the unesterified imidazoline and to other commercial inhibitors containing the imidazoline structure. The commercial inhibitors with which the partial esters were compared were those chosen for standards of excellent performance.

OTHER USES

These products are effective not only as corrosion inhibitors but can be used for a number of other purposes. For instance, they are useful as asphalt additives to increase the adhesiveness of the asphalt to the mineral aggregates. In the form of water soluble salts, they are useful as bactericides in the secondary recovery of oil. The hydroxycylic amidine may be subjected to extensive oxyalkylation by means of ethylene oxide, propylene oxide, butylene oxide, or the like prior to acylation. These are oxyalkylated and still have oil solubility as, for example, by the addition of propylene oxide or butylene oxide, or are oxyalkylated to produce water solubility as, for example, by means of ethylene oxide, glycide, etc. They are also oxyalkylated by combinations of propylene oxide and ethylene oxide so that both water solubility and oil solubility remain. Thereupon they are reacted with polycarboxylic acids. Such products are useful for a variety of purposes and particularly for those where nonionic surfactants or sequestered cationic surfactants are indicated.

In addition, the compounds of this invention have the following applications—

Agriculture: Additive for kerosene, use in phenothiazine and pyrethrum sprays, as fungicides, herbicidal oils.

Anti-static treatment: For hotel rugs, hospital floors, automobile upholstery, plastic and wax polishes, wool oils, lubricants for synthetic fibers.

Building materials: Water repellent treatment for plaster, concrete, cement, roofing materials, air entrainment, floor sealers, linoleum.

Cosmetics: Formulation of anti-perspirants, deodorants, sun screens, hair preparations.

De-emulsifying: In antibiotic extraction, breaking crude oil and water-gas for emulsions.

Detergents: Metal cleaning emulsions, lens cleaners, floor oils, dry cleaning detergents, radiator flushes, cesspool acid, boiler scale solvents, germicidal corrosion-inhibited acid detergents for dairies, enamel equipment toilet bowls.

Leather: Flat liquoring oils, pickling, acid degrasing, dye fixative.

Metals: Rust preventive oils, cutting oils, water displacing compounds, pickling inhibitor, solvent degreasing.

Paints: For improved adhesion of primers, preventing water spotting in lacquers, anti-skinning, pigment flushing, grinding and dispersing, anti-feathering in inks.

Petroleum: Use as a germicide in flood water treatment, de-emulsifying fuel oil additives, anti-strip agent in asphalt emulsions and cutbacks.

Textiles: In rubberizing, textile oils, dyeing assistants, softening agents.

Miscellaneous: Bentonite-amine complexes, metal-amine complexes, preparation of pentachlorphenates, quaternaries, plastisols, and rodent repellents.

Having thus described our invention what we claim as new and desire to obtain by Letters Patent, is:

1. A process of inhibiting the corrosion of ferrous metals in hydrocarbon systems characterized by contacting such metals with an acid-ester of the formula

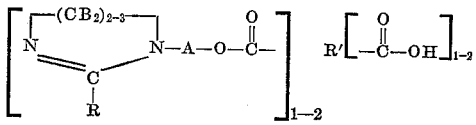

where B is selected from the group consisting of hydrogen and a lower alkyl group, A is a lower alkylene group having at least two carbon atoms, and R and R' are residues derived from carboxylic acids, each having 1–36 carbon atoms.

2. A process of inhibiting the corrosion of ferrous metals in hydrocarbon systems characterized by contacting such metals with an acid-ester of the formula

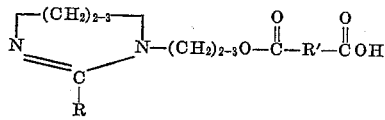

where R and R' are residues derived from carboxylic acids, each having 1–36 carbon atoms.

3. A process of inhibiting the corrosion of ferrous metals in hydrocarbon systems characterized by contacting such metals with an acid-ester of the formula

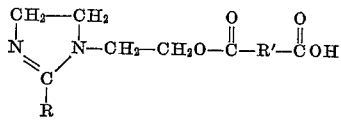

where R and R' are residues derived from carboxylic acids, each having 1–36 carbon atoms.

4. A process of inhibiting the corrosion of ferrous metals in hydrocarbon systems characterized by contacting such metal with a compound containing at least one free carboxylic acid group, said compound formed by reacting a cyclic amidine of the formula

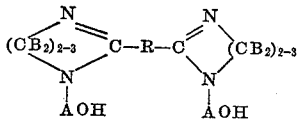

with a dicarboxylic acid of the formula

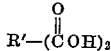

wherein R and R' are residues of dicarboxylic acids each having 1–36 carbon atoms, A is a lower alkylene group having at least two carbon atoms and B is selected from the group consisting of hydrogen and a lower alkyl group.

5. A process of inhibiting the corrosion of ferrous metals in hydrocarbon systems characterized by contacting such metal with a compound containing at least one free carboxylic acid group, said compound formed by reacting a cyclic amidine of the formula

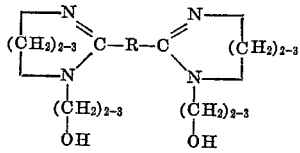

with a dicarboxylic acid of the formula

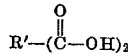

wherein R and R' are residues of dicarboxylic acids each having 1–36 carbon atoms.

References Cited in the file of this patent

UNITED STATES PATENTS

| | | |
|---|---|---|
| 2,211,001 | Chwala | Aug. 13, 1940 |
| 2,324,491 | De Groote et al. | July 20, 1943 |
| 2,468,163 | Blair et al. | Apr. 26, 1949 |
| 2,773,879 | Sterlin | Dec. 11, 1956 |
| 2,950,246 | Hughes et al. | Aug. 23, 1960 |